United States Patent
Zhang et al.

(10) Patent No.: US 8,390,260 B2
(45) Date of Patent: Mar. 5, 2013

(54) POWER SUPPLY FOR NEGATIVE VOLTAGE LOAD

(75) Inventors: Tao Zhang, Hangzhou (CN); Xiao-Lin Ma, Hangzhou (CN)

(73) Assignee: Acbel Polytech Inc., Taipei Hsien (TW)

( * ) Notice: Subject to any disclaimer, the term of this patent is extended or adjusted under 35 U.S.C. 154(b) by 737 days.

(21) Appl. No.: 12/653,076

(22) Filed: Dec. 8, 2009

(65) Prior Publication Data

US 2010/0246224 A1    Sep. 30, 2010

(30) Foreign Application Priority Data

Mar. 27, 2009    (TW) ................................ 98110056 A

(51) Int. Cl.
*G06F 5/00* (2006.01)

(52) U.S. Cl. .............................. 323/207; 307/82; 307/86

(58) Field of Classification Search .................. 323/207, 323/222, 299; 307/64, 80, 82, 85, 86, 43
See application file for complete search history.

(56) References Cited

U.S. PATENT DOCUMENTS

| 6,157,168 A | * | 12/2000 | Malik | ............................ 320/128 |
| 2008/0164761 A1 | * | 7/2008 | O'Bryant et al. | ............... 307/66 |

* cited by examiner

*Primary Examiner* — Harry Behm
*Assistant Examiner* — Matthew Grubb
(74) *Attorney, Agent, or Firm* — William E. Pelton, Esq.; Cooper & Dunham LLP

(57) ABSTRACT

A power supply for a negative voltage load has a switch-mode power unit, a monitoring unit, a first auxiliary power unit and a second auxiliary power unit. The switch-mode power unit has a rectifying circuit, a power factor correction circuit, a DC to DC power circuit. The first auxiliary power unit is connected to output terminals of the power factor correction circuit and converts DC power to a first DC power for driving the monitoring unit. The second auxiliary power unit is connected to the negative voltage load in parallel and converts negative power from the negative voltage load to a second DC power for driving the monitoring unit when AC power is interrupted. Since the first and the second auxiliary power unit do not work at the same time, the power supply can effectively enhances the conversion efficiency of the power supply.

12 Claims, 5 Drawing Sheets

POWER SUPPLY FOR NEGATIVE VOLTAGE LOAD

BACKGROUND OF THE INVENTION

1. Field of the Invention

The present invention relates to a power supply for a negative voltage load that has good performance on power factor correction and effectively enhances the conversion efficiency of the power supply no matter whether AC power is normally supplied or not.

2. Description of the Related Art

With reference to FIG. 3, a conventional power supply for a negative voltage load (60) has a switch-mode power unit (50), a monitoring unit (54) and an auxiliary power circuit.

The switch-mode power unit (50) comprises a rectifying filtering circuit (51), a power factor correction circuit (52) and a DC to DC power circuit (53). The rectifying filtering circuit (51) is connected to an AC power through a switch circuit (511), converts AC power to DC power and outputs the DC power to the power factor correction circuit (52). The power factor correction circuit (52) adjusts current and voltage of the DC power to be in phase with each other. The DC to DC power circuit (53) then bucks the DC power and produces at least one stable DC voltage source to the negative voltage load (60).

The monitoring unit (54) is connected to a control terminal of the switch circuit (511) and an output terminal of the rectifying filtering circuit (51) to detect status of the AC power source and turn on or off the switch circuit (511) according to whether the AC power is stable.

The auxiliary power circuit has a first auxiliary power unit (55) and a second auxiliary power unit (56). The first auxiliary power unit (55) is connected to the output terminals of the rectifying filtering circuit (51) to convert DC power to a first DC operating power. The second auxiliary power unit (56) is connected to the first auxiliary power unit (55), receives and converts the first DC operating power and sends the converted first DC operating power to the monitoring unit (56). Furthermore, the second auxiliary power unit (56) is connected to output terminals of the DC to DC power circuit (53), connects to the negative voltage load (60) in parallel, converts the constant DC voltage source from the DC to DC power circuit (53) or a DC load voltage source from the negative voltage load to a second DC operating power and sends the second DC operating power to the monitoring unit (54).

The negative voltage load (60) is usually operated with −54 Volts and may be a battery pack or system bus. When the AC power source is normal and is supplied to the negative voltage source (60) after converting by the switch-mode power unit (50), the negative voltage load (60) will store negative power and the monitoring unit (54) in the mean time will detect whether the AC power source is maintained normal. If the AC power source is maintained normal, the negative voltage load (60) then continues to receive DC power. If the AC power source becomes abnormal, the monitoring unit (54) then turns the switch circuit (511) off to interrupt the AC power source.

When the switch-mode power unit (50) is supplied with regular AC power source, the operating power of the monitoring unit (54) is provided by the second auxiliary power unit (56), wherein the AC power source is converted to a second operating DC power source via the rectifying filtering circuit (51), the first auxiliary power unit (55) and the second auxiliary power unit (56) to be a suitable operating power for the monitoring unit (54). After the monitoring unit (54) controls the switch circuit (511) to be in a turn-off status, the first auxiliary power unit (55) no longer outputs the first DC operating power. In the meantime, the second auxiliary power unit (56) converts the negative power stored in the negative voltage load (60) to a second DC operating power to continue providing operating power to the monitoring unit (54) since the second auxiliary power unit (56) is connected to the negative voltage load in parallel. Therefore the monitoring unit (54) is maintained powered to continue detecting the status of the AC power source and is able to turn on the switch circuit (511) as soon as the AC power source normally supplies. The AC power source then is inputted to the switch-mode power unit (50) again to provide DC power to the negative voltage load (60).

However, foregoing power supply for a negative voltage load has disadvantages as follows:

1. When the AC power is normal, the operating power of the monitoring unit (54) is provided by both of the first and the second auxiliary power units (55,56), therefore the overall conversion efficiency of the power supply is low.

2. As for a negative voltage load with −54 volts and the monitoring unit (54) with +5 volts, the first and the second auxiliary power unit (55,56) need to be designed as isolation type power circuits and overall volume and complexity are increased.

3. Because the first auxiliary power unit (55) connected to the rectifying filtering circuit (51) receives DC power for conversion from the rectifying filtering circuit (51), the switch-mode power unit (50) must have a filtering capacitor connected between the rectifying filtering circuit (51) and the power factor correction circuit (52) to convert AC power to DC power. However, the filtering capacitor will deteriorates the power factor correction.

With further reference to FIG. 4, another conventional power supply for a negative voltage load similar to foregoing conventional power supply is disclosed for improving some of the aforementioned shortcomings. The difference is that the monitoring unit (54a) in FIG. 4 is connected to output terminals of the first auxiliary power unit (55a), the second auxiliary power unit (56a) is connected to the monitoring unit (55a) via the first auxiliary power unit (55a). Therefore, when the AC power is regular, the monitoring unit (54a) is powered only by the first auxiliary power unit (55a). When the AC power is irregular and is cut off by the monitoring unit (54a) via the switch circuit (511), the monitoring unit (54a) is powered by the second auxiliary power unit (56a) through the first auxiliary power unit (55a). Since AC power has much more time on providing regular power than being cut off, the power supply has better overall conversion efficiency than foregoing conventional one while the AC power is regular. However, when the AC power is cut off due to irregularity, the power supply still has bad conversion efficiency since the second auxiliary power unit (56a) has to go through the first auxiliary power unit (55a) to provide power to the monitoring unit (54a). Furthermore, the rectifying filtering circuit (51) still contains a filtering capacitor (CF) that causes negative effect on power factor correction of the power factor correction circuit (52).

To overcome the shortcomings, the present invention provides a power supply for a negative voltage load to mitigate or obviate the aforementioned problems.

SUMMARY OF THE INVENTION

The main objective of the invention is to provide a power supply for a negative voltage load that has good performance on power factor correction and effectively enhances the conversion efficiency of the power supply no matter whether AC power is normally supplied or not.

The power supply comprises:
a switch-mode power unit having
a rectifying circuit connected to an AC power source and converting AC power to DC sine wave power;
a power factor correction circuit having input terminals connected to the rectifying circuit, receiving the DC sine wave power from the rectifying circuit, adjusting current and voltage of the DC sine wave power to be in phase with each other and having output terminals; and
a DC to DC power circuit having input terminals connected to the output terminals of the power factor correction circuit, having output terminals connected to power terminals of the negative voltage load, reducing and stabilizing the adjusted DC power from the power factor correction circuit and outputting at least one low-voltage DC power to the negative voltage load;
a monitoring unit coupled to the switch-mode power unit to detect operation status of the switch-mode power unit and having power terminals, an input terminal and an output terminal;
a first auxiliary power unit having input terminals connected to the output terminals of the power factor correction circuit, having output terminals connected to the power terminals of the monitoring unit, converting the DC power from the power factor correction circuit to a first DC power and outputting the first DC power to the power terminals of the monitoring unit; and
a second auxiliary power unit having input terminals connected to the output terminals of the DC to DC power circuit and the input terminal of the monitoring unit, having output terminals connected to the power terminals of the monitoring unit, having an enable terminal connected to the output terminal of the monitoring unit, enabled by a control signal produced by the monitoring unit, converting negative voltage power of the negative voltage load to a second DC power and outputting the second DC power to the power terminals of the monitoring unit.

The present invention mainly makes power terminals of the monitoring unit to be connected to output terminals of the first and the second auxiliary power units, wherein the first and the second auxiliary power units do not connect to each other. When the AC power is normally supplied, the first auxiliary power unit provides operating power to the monitoring unit and turns off the second auxiliary power unit at the same time. When the AC power is interrupted, the first auxiliary power unit no longer provides DC power to the monitoring unit, and the monitoring unit then turn on the second auxiliary power unit to convert negative voltage power of the negative voltage load to provide operating power to the monitoring unit. Therefore, the monitoring unit can maintain working. Because the input terminals of the first auxiliary power unit is connected to the output terminals of the power factor correction circuit of the switch-mode power unit, the rectifying circuit does not have to connect a rectifying capacitor, and thereby the power factor correction performance is enhanced. Besides, only one auxiliary power unit provides DC power to the monitoring unit at one time, therefore the conversion efficiency of the power supply can be effectively increased.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
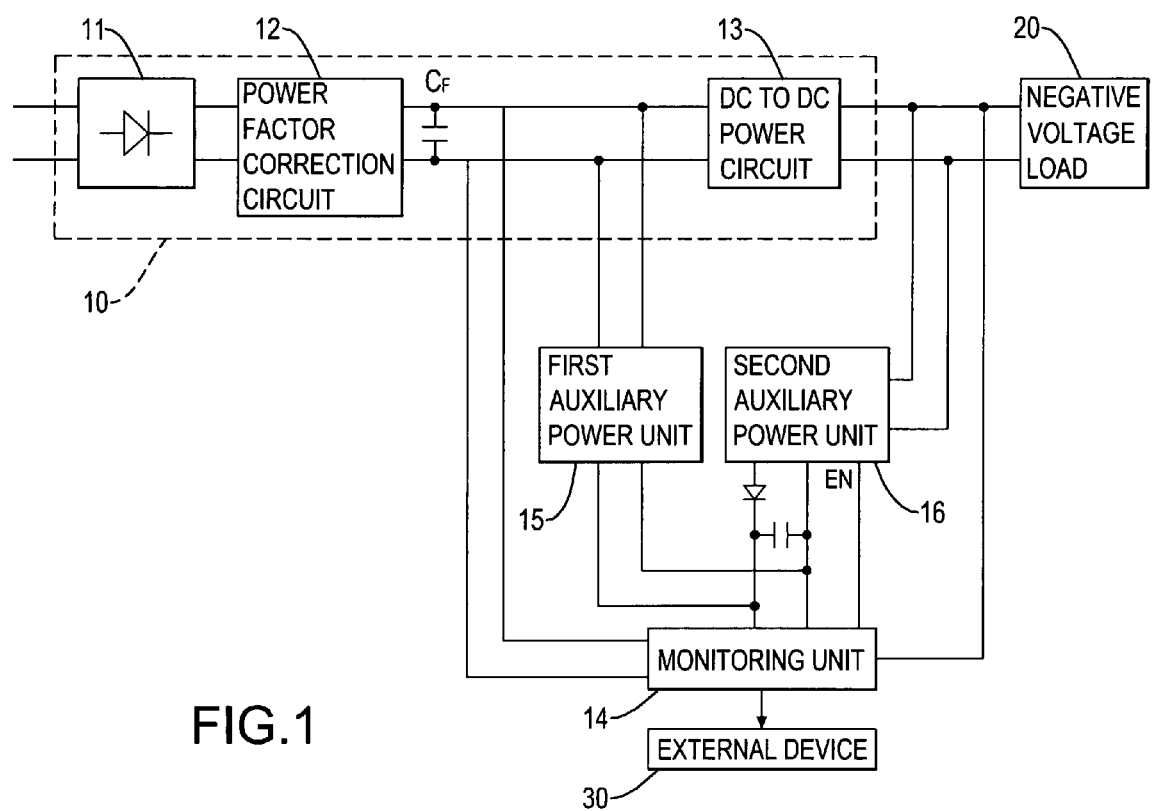
FIG. 1 is a block diagram of a power supply in accordance with the present invention.

With reference to FIG. 1, a power supply for a negative voltage load in accordance with the present invention comprises a switch-mode power unit (10), a monitoring unit (14), a first auxiliary power unit (15) and a second auxiliary power unit (16).

The switch-mode power unit (10) has a rectifying circuit (11), a power factor correction circuit (12) and a DC to DC power circuit (13). The rectifying circuit (11) is connected to an AC power source and converts the AC power to a DC sine wave power. The power factor correction circuit (12) is connected to the rectifying circuit (11), receives the DC sine wave power and adjusts current and voltage of the DC sine wave power to be in phase with each other. The DC to DC power circuit (13) is connected to the power factor correction circuit (12), reduces and stabilizes the adjusted DC power and produces at least one low-voltage DC power to a negative voltage load (20).

The monitoring unit (14) is coupled to the switch-mode power unit (10) to detect operation status of the switch-mode power unit (10). Preferably the monitoring unit (14) is coupled to output of the DC to DC power circuit (13) to monitor voltage and current status and sends the information of the voltage and current status to an external host device.

The first auxiliary power unit (15) has input terminals connected to output terminals of the power factor correction circuit (12) and has output terminals connected to power terminals of the monitoring unit (14). The first auxiliary power unit (15) converts the DC power from the power factor correction circuit (12) to a first DC power and outputs the first DC power to the power terminals of the monitoring unit (14). Preferably the first auxiliary power unit (15) is an isolation type power circuit.

The second auxiliary power unit (16) has input terminals, output terminals and an enable terminal (EN). The input terminals are connected between the negative voltage load (20) and the output terminals of the DC to DC power circuit (13) and connected to an input terminal of the monitoring unit (14). The output terminals are connected to the power terminals of the monitoring unit (14). The enable terminal (EN) is connected to an output terminal of the monitoring unit (14), so the monitoring unit (14) generates a control signal to the enable terminal (EN) to enable the second auxiliary power unit (16). Then the second auxiliary power unit (16) converts negative voltage power of the negative voltage load (20) to a second DC power and outputs the second DC power to the monitoring unit (14). Preferably the second auxiliary power unit (16) is a non-isolation type power circuit.

Figure 2A:
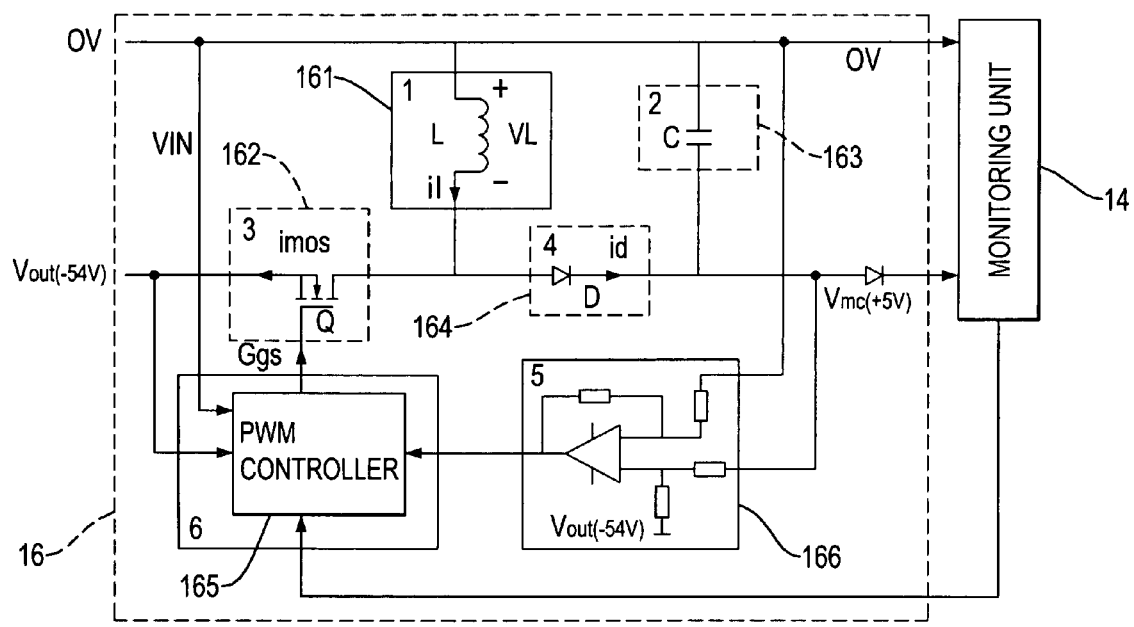
FIG. 2A is a circuit diagram of a second auxiliary power unit of a first embodiment of the present invention.

With further reference to FIG. 2A, the second auxiliary power unit (16) is a non-isolation type buck-boost power circuit and has an energy storage inductor (161), a filtering capacitor (163), a PWM controller (165) and a voltage feedback unit (166).

The energy storage inductor (161) is connected to power terminals of the negative voltage load (20) in parallel with an active switch (162). Preferably the active switch (162) is a MOSFET, wherein the gate of the MOSFET is the control terminal.

The filtering capacitor (163) is connected to the energy storage inductor (161) in parallel with a reverse connected diode (164) and connected to the power terminals of the monitoring unit (14) to provide a low positive voltage DC power to the monitoring unit (14).

The PWM controller (165) is connected to the power terminals of negative voltage load (20), connected to a control terminal of the active switch (162) to output a PWM signal to the active switch (162) and has an enable terminal (EN) connected to the monitoring unit (14) to receive the control signal from the monitoring unit (14).

The voltage feedback unit (166) is connected to the power terminals of the monitoring unit (14) and a voltage feedback terminal of the PWM controller (165), wherein the PWM controller (165) modulates the pulse-width of the PWM signals according to voltage variation of the power terminal of the monitoring unit (14) and thereby decides turn-on time of the active switch (162). Preferably the voltage feedback unit (166) is a differential amplifier having inverting input and non-inverting input connected to the power terminals of the monitoring unit (14).

Figure 2B:
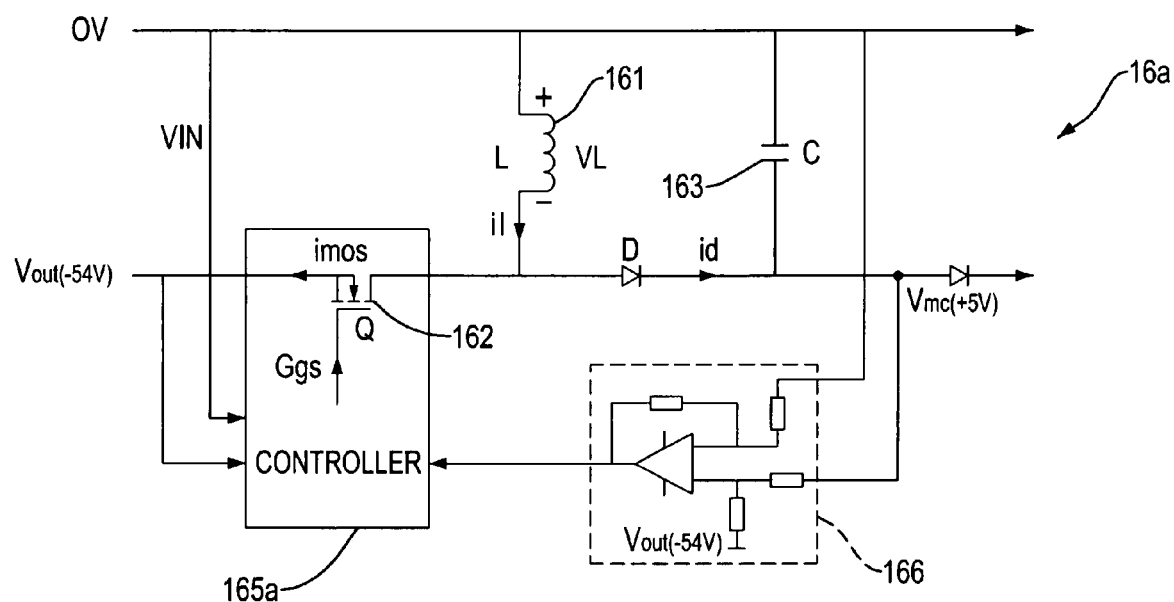
FIG. 2B is a circuit diagram of a second auxiliary power unit of a second embodiment of the present invention.
Figure 3:
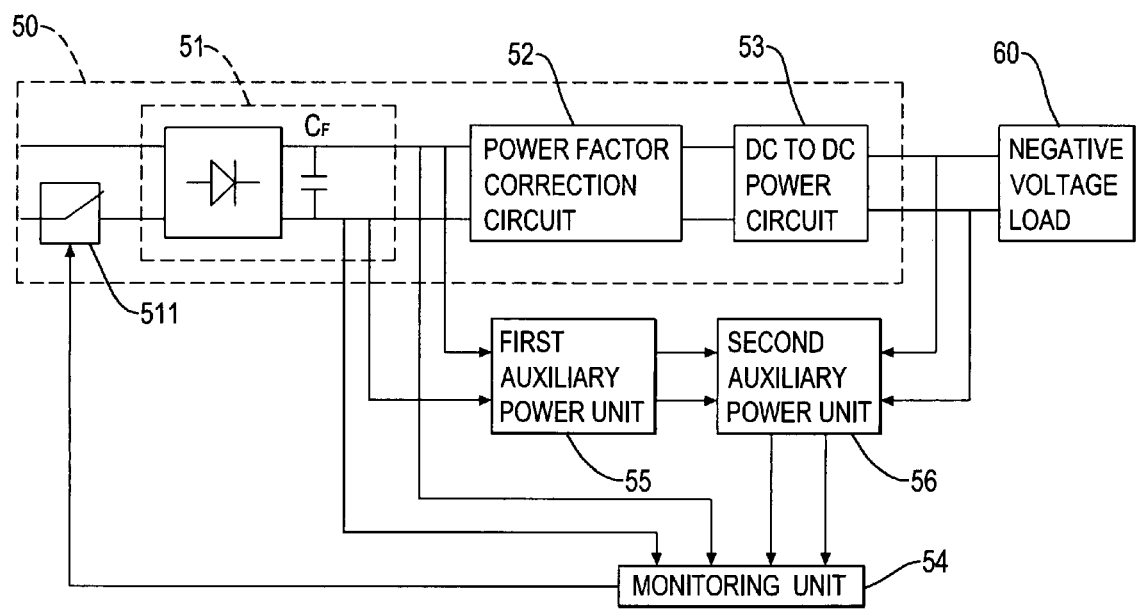
FIG. 3 is a block diagram of a conventional power supply.
Figure 4:
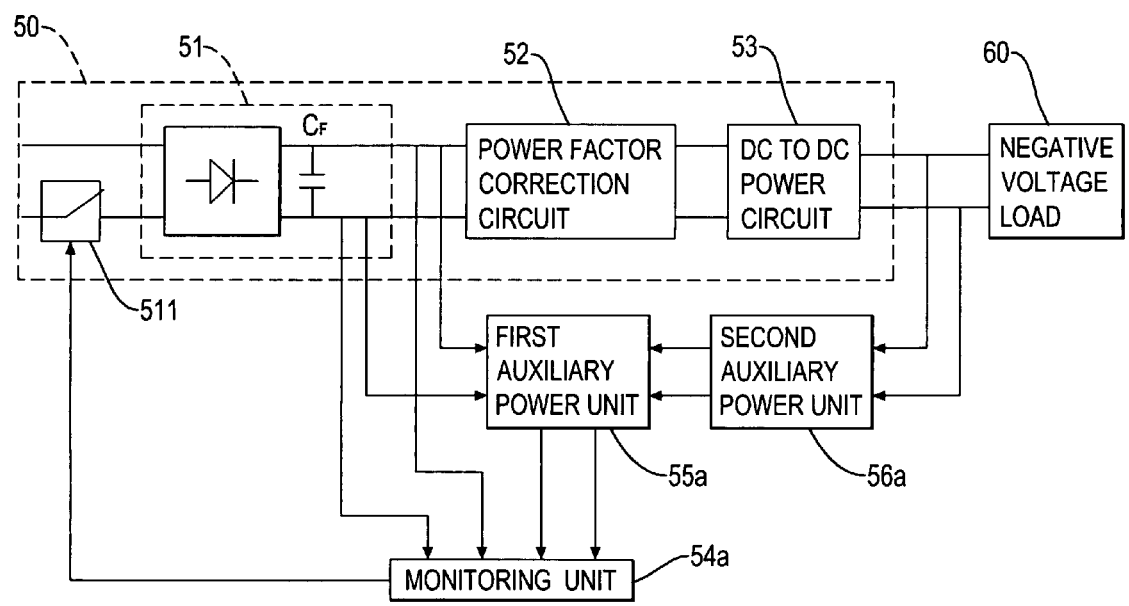
FIG. 4 is a block diagram of another conventional power supply.

With further reference to FIG. 2B, in a second embodiment of the second auxiliary power unit (16a), the PWM controller (165a) may be integrated with the active switch (162) for economizing substantial circuit space.

Aforementioned second auxiliary power unit (16, 16a) converts the negative voltage power of the negative voltage load (20) to a DC power of lower positive voltage level as the operation power for the monitoring unit (14). Because the monitoring unit (14) decides whether to output a control signal according to the status of the AC power, the PWM controller of the second auxiliary power unit (16,16a) may generate PWM signals to the active switch (162) when receiving the control signal from the monitoring unit (14) once the AC power is off and the filtering capacitor (163) then provides a DC power with lower positive voltage level to the power terminals of the monitoring unit (14). On the other hand, once the AC power is recovered, the PWM controller stops outputting the PWM signals, the active switch (162) connected between the energy storage inductor (161) and the power terminals of the negative voltage load (20) will be turned off and stop providing DC power to the power terminals of the negative voltage load (20). Besides, the second auxiliary power unit (16,16a) is implemented as a non-isolation type power circuit and is contributive to reduce the volume and cost of the power supply.

The circuit of the present invention is described more particularly as follows:

1. When the AC power is normally supplied:

The AC power is rectified by the rectifying circuit (11) to be a DC sine wave power. Current and voltage of the DC sine wave power is adjusted in phase by the power factor correction circuit (12). The DC to DC power circuit (13) then reduces and stabilizes the DC power and thereby produces at least one lower voltage DC power. Since negative electrode and positive electrode of the power terminals of the negative voltage load (20) are respectively connected to the positive electrode and negative electrode of the lower voltage DC power, the lower voltage DC power acts as a negative DC power with a negative voltage level to the negative voltage load (20). The first auxiliary power unit (15) reduces voltage of the DC power from the power factor correction circuit (12) and outputs a first DC power to the power terminals of the monitoring unit (14). In the mean time, the monitoring unit (14) does not output a control signal to the second auxiliary power unit (16) when the AC power is in regular status, therefore the second auxiliary power unit (16) do not work.

2. When the AC power is interrupted:

The switch-mode power unit (10) no longer outputs DC power of a negative voltage level to the negative voltage load (20), and the first auxiliary power unit (15) also stops outputting the first DC power to the monitoring unit (14). The monitoring unit (14) then instantly outputs a control signal to the enable terminal (EN) of the second auxiliary power unit (16). The second auxiliary power unit (16) then starts to convert the negative DC power of the negative voltage load (20) to a second DC power and provides the second DC power to the power terminals of the monitoring unit (14) to keep driving the monitoring unit (14). The second auxiliary power unit (16) keeps outputting the second DC power until the AC power is recovered.

Therefore, the present invention has following advantages:

1. The present invention has better power factor correction: since the input terminals of the first auxiliary power unit (15) are connected to the output terminals of power factor correction circuit (12) of the switch-mode power unit (10), the rectifying unit (11) does not have to connect a rectifying capacitor.

2. The present invention improves overall conversion efficiency: the present invention uses only one auxiliary power unit to provide DC power to the monitoring unit (14) at one time, therefore the conversion efficiency of the power supply can be effectively enhanced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A power supply for a negative voltage load comprising:
a switch-mode power unit having
a rectifying circuit connected to an AC power source and converting AC power to DC sine wave power;
a power factor correction circuit having input terminals connected to the rectifying circuit, receiving the DC sine wave power from the rectifying circuit, adjusting current and voltage of the DC sine wave power to be in phase with each other and having output terminals; and
a DC to DC power circuit having input terminals connected to the output terminals of the power factor correction circuit, having output terminals connected to power terminals of the negative voltage load, reducing and stabilizing the adjusted DC power from the power factor correction circuit and outputting at least one low-voltage DC power to the negative voltage load;
a monitoring unit coupled to the switch-mode power unit to detect operation status of the switch-mode power unit and having power terminals, an input terminal and an output terminal;
a first auxiliary power unit having input terminals connected to the output terminals of the power factor correction circuit, having output terminals connected to the power terminals of the monitoring unit, converting the DC power from the power factor correction circuit to a first DC power and outputting the first DC power to the power terminals of the monitoring unit; and a second auxiliary power unit having input terminals connected to the output terminals of the DC to DC power circuit and the input terminal of the monitoring unit, having output terminals connected to the power terminals of the monitoring unit, having an enable terminal connected to the output terminal of the monitoring unit, enabled by a control signal produced by the monitoring unit, converting negative voltage power of the negative voltage load to a second DC power and outputting the second DC power to the power terminals of the monitoring unit.

2. The power supply as claimed in claim 1, wherein the first auxiliary power unit is an isolation type power circuit.

3. The power supply as claimed in claim 2, wherein the second auxiliary power unit is a non-isolation type power circuit.

4. The power supply as claimed in claim 3, wherein the second auxiliary power unit is a non-isolation type buck-boost power circuit and having an energy storage inductor connected to the power terminals of negative voltage load in parallel with an active switch;

a filtering capacitor connected to the energy storage inductor in parallel with a reverse-connected diode and connected to the power terminals of the monitoring unit to provide a low positive voltage DC power to the monitoring unit;

a PWM controller connected to the power terminals of negative voltage load, connected to a control terminal of the active switch to output a PWM signal to the active switch and having an enable terminal connected to the monitoring unit to receive the control signal from the monitoring unit; and a voltage feedback unit connected to the power terminals of the monitoring unit and a voltage feedback terminal of the PWM controller, wherein the PWM controller modulates the pulse-width of the PWM signals according to voltage variation of the power terminal of the monitoring unit and thereby decides turn-on time of the active switch.

5. The power supply as claimed in claim 4, wherein the voltage feedback unit is a differential amplifier having inverting input and non-inverting input connected to the power terminals of the monitoring unit.

6. The power supply as claimed in claim 5, wherein the active switch is a MOSFET, wherein the gate of the MOSFET is the control terminal.

7. The power supply as claimed in claim 4, wherein the active switch is a MOSFET, wherein the gate of the MOSFET is the control terminal.

8. The power supply as claimed in claim 1, wherein the second auxiliary power unit is a non-isolation type power circuit.

9. The power supply as claimed in claim 8, wherein the second auxiliary power unit is a non-isolation type buck-boost power circuit and having an energy storage inductor connected to the power terminals of negative voltage load in parallel with an active switch;

a filtering capacitor connected to the energy storage inductor in parallel with a reverse-connected diode and connected to the power terminals of the monitoring unit to provide a low positive voltage DC power to the monitoring unit;

a PWM controller connected to the power terminals of negative voltage load, connected to a control terminal of the active switch to output a PWM signal to the active switch and having an enable terminal connected to the monitoring unit to receive the control signal from the monitoring unit; and a voltage feedback unit connected to the power terminals of the monitoring unit and a voltage feedback terminal of the PWM controller, wherein the PWM controller modulates the pulse-width of the PWM signals according to voltage variation of the power terminal of the monitoring unit and thereby decides turn-on time of the active switch.

10. The power supply as claimed in claim 9, wherein the voltage feedback unit is a differential amplifier having inverting input and non-inverting input connected to the power terminals of the monitoring unit.

11. The power supply as claimed in claim 10, wherein the active switch is a MOSFET, wherein the gate of the MOSFET is the control terminal.

12. The power supply as claimed in claim 9, wherein the active switch is a MOSFET, wherein the gate of the MOSFET is the control terminal.

* * * * *